United States Patent [19]
Bender et al.

[11] Patent Number: 6,111,894
[45] Date of Patent: Aug. 29, 2000

[54] HARDWARE INTERFACE BETWEEN A SWITCH ADAPTER AND A COMMUNICATIONS SUBSYSTEM IN A DATA PROCESSING SYSTEM

[75] Inventors: Carl A. Bender, Highland; Paul D. DiNicola, Hurley; Kevin J. Gildea, Bloomington; Rama K. Govindaraju; Chulho Kim, both of Poughkeepsie; Jamshed H. Mirza, Woodstock; Gautam H. Shah, Wappingers Falls, all of N.Y.

[73] Assignee: International Business Machines Corporation, Armonk, N.Y.

[21] Appl. No.: 08/920,084

[22] Filed: Aug. 26, 1997

[51] Int. Cl.[7] .................................................. G06F 3/00
[52] U.S. Cl. .................... 370/469; 370/259; 370/467; 395/500.46; 709/301; 710/8; 712/36
[58] Field of Search .................................. 370/535, 465, 370/400, 412, 259, 351, 469, 467; 709/226, 229, 220, 230, 329, 301; 395/500.47, 500.46; 379/90.01; 710/127, 8; 712/35, 36

[56] References Cited

U.S. PATENT DOCUMENTS

| | | | |
|---|---|---|---|
| 5,572,572 | 11/1996 | Kawan et al. | 379/90.01 |
| 5,636,371 | 6/1997 | Yu | 395/500.47 |
| 5,680,551 | 10/1997 | Martino, II | 709/226 |
| 5,742,825 | 4/1998 | Mathur et al. | 709/329 |
| 5,909,559 | 6/1999 | So | 710/127 |
| 5,958,016 | 9/1999 | Chang et al. | 709/229 |
| 5,987,590 | 11/1999 | So | 712/35 |

*Primary Examiner*—Hassan Kizou
*Assistant Examiner*—John Pezzlo
*Attorney, Agent, or Firm*—Floyd A. Gonzalez

[57] ABSTRACT

Method, apparatus and program product for communicating from a node to a communications device. A Hardware Abstraction Layer (HAL) provides functions which can be called from user space in a node to access the communications device. An instance of HAL is created in the node. Device specific characteristics from the communications device and a pointer pointing to HAL functions for accessing the communications device are obtained by HAL. HAL then opens multiple ports on the communications device using the functions pointed to by the pointer, and messages are sent between the node and the communications device. The messages thus sent are optimized with respect to the communications device as determined by the obtained device specific characteristics. Multiple processes and protocol stacks may be associated with each port in a single instance of HAL. A further embodiment provides that multiple virtual ports may be associated with a port, with a multiple protocol stacks associated with each virtual port. A further embodiment provides that multiple communications devices may be associated with a single instance of HAL.

42 Claims, 3 Drawing Sheets

HARDWARE INTERFACE BETWEEN A SWITCH ADAPTER AND A COMMUNICATIONS SUBSYSTEM IN A DATA PROCESSING SYSTEM

BACKGROUND OF THE INVENTION

The present invention relates to an interface between an application program and various models of hardware, and more particularly relates to an interface between a switch adapter and a communications subsystem in a data processing system.

The IBM Scalable POWERparallel (SP) system is a distributed parallel data processing system that incorporates a central switch which provides a high efficiency interconnection of processor nodes. There are several versions of SP switches and switch-adapters (which connect processors to switches). The existing SP communications protocol software has unique adapter dependent software for each adapter type and different protocols have adapter specific software which is different between protocols for the adapter type. With each new switch-adapter, each of the protocol software functions is modified to provide support for the new adapter device. Currently there are N (three) communication protocol functions (Internet Protocol (IP), Message Passing Interface protocol (MPI), Service), and each is separately modified to support a single adapter type and each has M versions of adapter device interfaces which they support. The development and support bill for the SP communications software is N×M. In the near future there are new communications protocols (e.g., Low-level Application Programming Interface (LAPI)) and several new switch adapters planned for the SP. So continuing the current protocol structure results in the continued escalation of the N×M multiplier! A further restriction in today's system is that all tasks within a parallel job must be connected to the same device type (e.g., all IP, all TB3).

In addition to providing a common interface solution for the current environment described above, there needs to be support for dynamic tasking (parallel job size can shrink and/or grow during run time) and multiple communication channel protocol support (e.g., a parallel job running some tasks on an SP connected via switch path and some tasks running on stand-alone workstations connected via IP/token-ring).

A third problem needing to be solved is the requirement to provide low latency asynchronous notification, efficient data movement, and low overhead device management.

SUMMARY OF THE INVENTION

The Hardware Abstraction Layer (HAL) interface is a communications architecture and application programming interface (API) which provides a common portable network device-link interface which can be used by all communications protocol stacks. HAL both abstracts device unique functions and encapsulates multiple component (ie, DD, KE (Kernel extension), Microcode, Hardware) interfaces into a single API definition. The split of functionality between these components (including the HAL layer) can vary from platform to platform. HAL "devices" range from communications hardware adapters, VIA (Virtual Interface Architecture), IP socket interface and shared memory, to a virtual HAL device.

HAL is a per-process entity that provides communication channels (and a library of functions to access these channels) once addressability to a communication device has been established. A user process may have one or more instances of HAL active at any time. Because each instance of HAL can be for a different device type, multiple communication channel protocol support is achieved. For the simpler case of only one HAL port per task, each task is allowed to open a different HAL device. This provides powerful flexibility to any job scheduler/management system. Two examples:

1. an N-way parallel job can be started with some tasks running on SP nodes and connected via the SP's switch with a subset of tasks running on stand-alone workstations connected via IP/token-ring.
2. an N-way job can be started with all tasks running on SP nodes even though connections to the SP switch exist for only a subset of the tasks. The other tasks will use HAL-IP device type connections.

With synchronization provided above the HAL layer, further dynamic partitioning capability is provided because HAL ports can simply be closed and re-opened. The "open" operation associates the port with a group of tasks by means of a job partition-configuration-table (which is managed and loaded external to HAL). So, each successive open operation can load a different table and thus allows the number of tasks to dynamically shrink or grow. This same mechanism provides task recoverability by allowing a failed task to be either simply dropped from the table or dropped and replaced, and thus maintaining a constant number of tasks per job.

The attributes associated with HAL are:

1. Support for multiplexing. HAL is capable of supporting multiple user space ports/windows (channels) in a single process.
2. Provide a datagram type of service. This implies:
   a. Block-oriented: as far as HAL is concerned the "whole" message is sent/received; i.e., there is no "stream" support.
   b. Limited in size: varying message sizes up to a implementation specific maximum size is supported. (Typically the maximum limit would correspond to the hardware packet, frame or superpacket size)
3. HAL operations are highly efficient—the interface provides functions to avoid copies, minimize expensive device interactions, and achieve low latency asynchronous event notification by means of dedicated notification-threads which use wait-and-post operations.
4. HAL operations are atomic—i.e. it does not have any communication state. Once a message is accepted by HAL, it is guaranteed to be transferred into the network—however, there are no guarantees on whether it will reach the destination!
5. HAL is asynchronous with respect to the higher level layers. Asynchronous nature implies a need for an event notification mechanism.
   a. Notification includes both send and receive events. Send notification is delivered when some specified number of packets have been moved from the "device-specific buffers" into the network. Receive notification is delivered when some specified number of new packets have been received from the network.
   b. Different protocol stacks (such as MPI, IP, . . . ) are allowed to install callback routines to be invoked by HAL. These routines can be used in interrupt mode. HAL may NOT always interrupt, it may just set a flag indicating that data has been received on a particular port.
   c. Along with the callback routines HAL will allow the user to specify how often these callback functions are invoked.

6. HAL supports physical and virtual ports (ports mean a communication channel connection to the network). In the case of virtual ports, a user/application would be configured to have multiple protocol stacks multiplexing over a single physical port. It should be noted that the support for virtual ports does not necessarily imply tagging overheads to the case when just physical ports are used for communication.

7. A process can use multiple HAL instances for communication. Each instance may correspond to a specific device/adapter. Each HAL instance may support a variable number of physical ports. The number of virtual ports that can be mapped to a physical port is also an implementation specific parameter. A user can initialize/terminate instances of HAL and open/close ports on an instance of HAL.

An object of the present invention is to provide a single portable interface between the communication subsystem of a node and the switch adapter in a distributed parallel data processing system. A protocol stack using the HAL device interface only has one device interface which provides portability over a range of devices within a single system and is isolated from changes needed to support future device enhancements. HAL also removes today's job scheduling restrictions which require that all device types for tasks within a parallel job be homogeneous and that the number of tasks per node (or workstation) be limited to a (small) fixed number.

It is another object to provide an architecture and API which are optimized for performance by avoiding copies, minimizing overheads by allowing messages to be grouped into larger units, and providing low-latency asynchronous event notification.

It is another object of the present invention to provide a consistent architecture for communication between heterogeneous systems.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
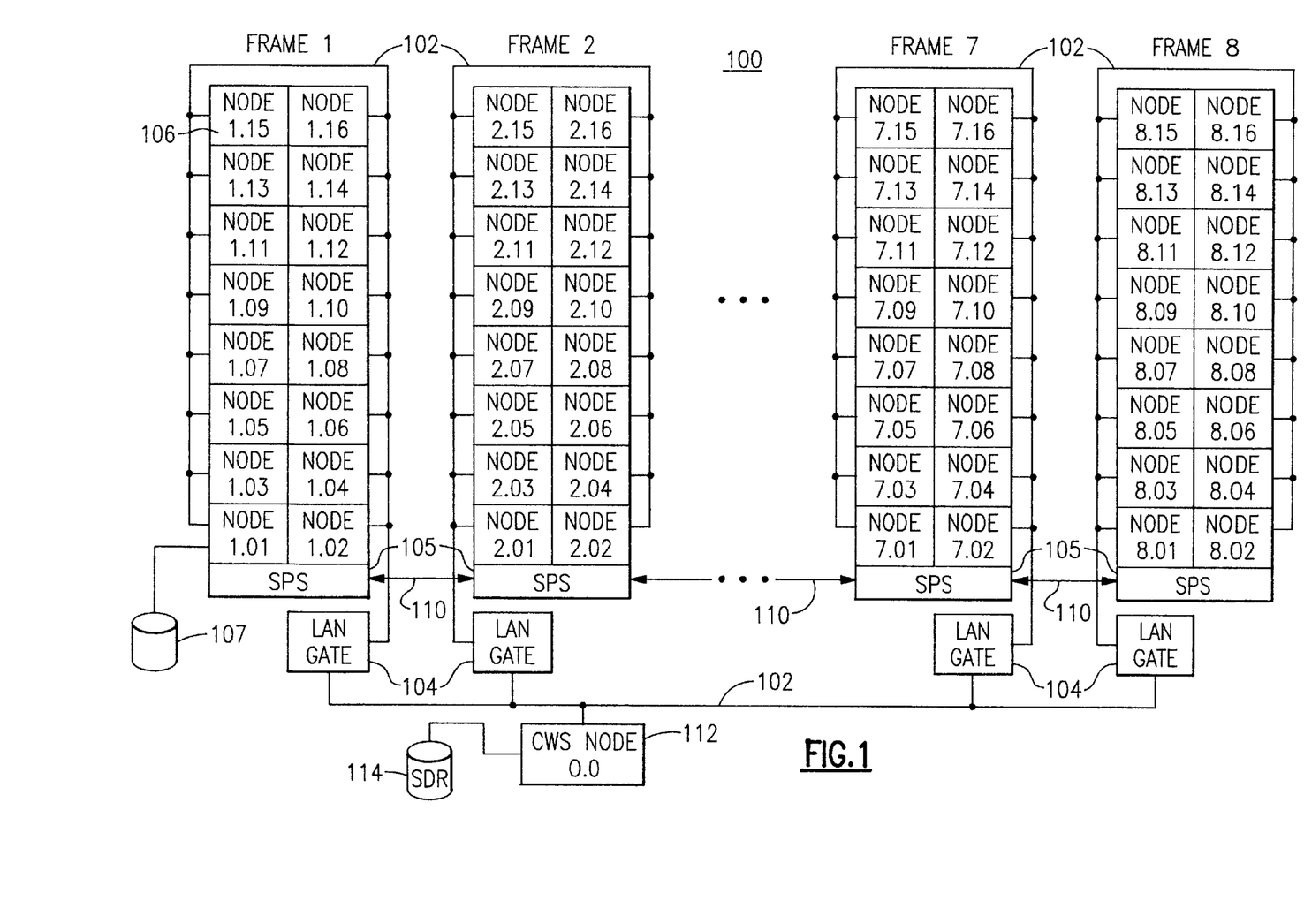
FIG. 1 is a block diagram of a distributed, parallel data processing system usable with the present invention.

FIG. 1 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 on which is stored the system data repository files (SDR). The SDR files include such information as a list of nodes that are in the system and their configuration. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As well understood in the art, the CWS node 112 sends system data and control signals to the frames of the SP computer 100 by means of the LAN 102 while messages and data may be sent from one to another of the nodes 106 by means of the high performance switches 105. Adapters are provided between each node 106 and the SPS switch 105. One such adapter is disclosed in U.S. Pat. No. 5,448,558 to Gildea et al. for METHOD AND APPARATUS FOR MANAGING PACKET FIFOS issued Sep. 5, 1995, owned by the assignee of the present application. The adapters mention herein (TB2, TB3, TBMX (referred to collectively herein as TBX), and AdapterX (future adapters)) are present or future adapters of International Business Machines Corporation of Armonk, N.Y.

The Low-level Application Programming Interface (LAPI) discussed herein in connection with the present invention is disclosed in U.S. patent application Ser. No. 08/918,816 for METHOD AND APPARATUS FOR EFFICIENT COMMUNICATIONS USING ACTIVE MESSAGES by Bender et. al. (Attorney Docket No. PO9-97-132) owned by the assignee of the present invention.

Figure 2:
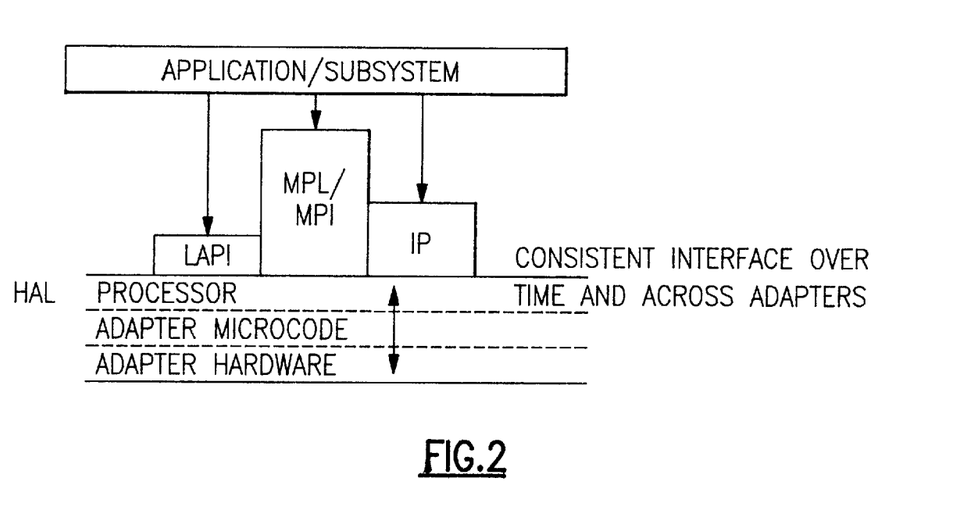
FIG. 2 is a block diagram showing the HAL layer of the present invention in the operating system of each node of the system of FIG. 1.

The Hardware Abstraction Layer (HAL) is the communication device interface. HAL both formalizes today's interface, known as VMSMU (Virtual Memory to Switch Management Unit) and expands its architecture to include future node and adapter functionality. The HAL interface is expected to be stable over time and across adapters. HAL is intended to be lean, provide basic functionality, and encapsulate device specifics. The Low-level Applications Programming Interface (LAPI) is a new communications API. LAPI is a thin layer above the HAL interface, as shown in FIG. 2, and includes reliability and flow control. LAPI uses a basic "Active Message Style" mechanism which provides a one-sided communications model. The library provides a relatively small set of fixed functions (e.g. lapi_get, lapi_put) and a general Active Message function which allows users to supply extensions by means of additions to the notification handlers.

The present invention provides an API which efficiently abstracts the adapter hardware. This will help isolate the changes required in CSS as the underlying hardware evolves. This abstraction is shown in FIG. 2. A single process can make GA (Global Array distributed shared memory communications library) calls via LAPI and make message passing calls.

HAL is a per-process entity that provides communication channels (and a library of functions to access these channels) once addressability to a communication device has been established. A user process may have one or more instances of HAL active at any time. HAL spans/encapsulates both the processor and the adapter. The split of functionality between the processor and the adapter depends on the platform/implementation.

The functionality we associate with the HAL layer is general enough to map on to any adapter/device and is such that it does not rule out any of the devices (possibly because too much functionality is assumed to be provided by HAL). The attributes associated with HAL are:

1. Support for multiplexing. HAL should be capable of supporting multiple user space ports/windows (channels) in a single process. User space will be understood by those skilled in the art as that mode or state in which an application runs as contrasted to the operating system or Kernel space. Providing a user space connection to the communication device avoids the penalty of the user mode switching to the Kernel and back.
2. Since HAL is a per-process entity, a port (real or virtual) cannot be shared by two different processes.
3. Provide a datagram type of service. By this we imply:
    Block-oriented: as far as HAL is concerned the "whole" message is sent/received; i.e., there is no "stream" support.
    Limited in size: varying message sizes up to a implementation specific maximum size is supported. (Typically the maximum limit would correspond to the hardware packet, frame or superpacket size)
    Not necessarily reliable: if reliability of messages has to be guaranteed, it has to be built on top of HAL.
4. Does not provide flow control.
5. Does not ensure in-order delivery. (Specifically, any kind of matching has to be provided by the layer built on top of HAL or the users of HAL).
6. HAL is stateless—i.e it does not have any communication state; in other words, the communication operation is atomic. Once a message is accepted by HAL, it is guaranteed to be shoved into the network—however, there are no guarantees on whether it will reach the destination!.
7. HAL is asynchronous with respect to the higher level layers. Asynchronous nature implies a need for notification/signalling mechanism.
    Signalling includes both send and receive notification. Send notification implies a "signal" has to be delivered when some specified number of packets have been moved from the "device-specific buffers" into the network. Signal does not necessarily imply Unix signals—it refers to event notification mechanism in general. Receive notification implies a signal has to be delivered when some specified number of new packets have been received from the network.
    Different stacks (such as MPI, LAPI, . . . ) will be allowed to install callback routines to be invoked by HAL. These routines can be used to do polling or signaling. The default is polling. The term callback function is not restricted to just the callbacks associated with RecvNCall. Specifically the callback routine could also refer to the functionality implemented by the signal (SIGIO) handler in our current implementation. HAL may NOT always interrupt, it may just set a flag indicating that data has been received on a particular port.
    Along with the callback routines HAL will allow the user to specify how often these callback functions are invoked (i.e.,say after every message arrival or after every 10 messages, etc.).
8. HAL supports physical and virtual ports (ports mean a communication channel over an adapter). Virtual ports will not be implemented in the first phase. In the case of virtual ports, a user/application decides if they want multiple protocol stacks multiplexing over a physical port. It should be noted that the support for virtual ports does not necessarily imply tagging overheads to the case when just physical ports are used for communication.
9. A process can use multiple HAL instances for communication. Each instance may correspond to a specific device/adapter. Each HAL instance may support a variable number of physical ports. The number of virtual ports that can be mapped to a physical port is also an implementation specific parameter. A user can initialize/terminate instances of HAL and open/close ports on an instance of HAL.

Figure 3:
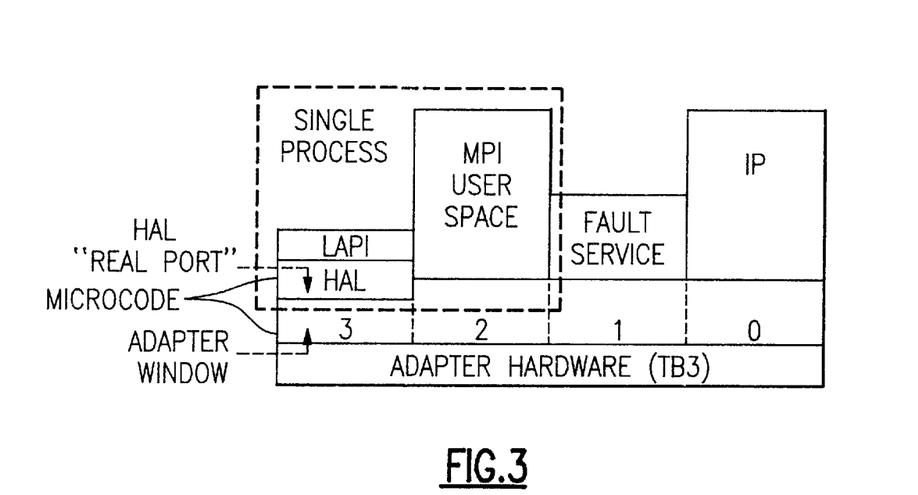
FIG. 3 is one embodiment of a node configuration of a node of the system of FIG. 1 in which the present invention provides an interface to a switch adapter.

The first implementation of HAL is shown in FIG. 3, which is an embodiment of a node configuration in which HAL provides the interface to the switch adapter for the LAPI library and can coexist within a single process with MPI which has an existing interface to the adapter. Also shown are the current IP and Fault Service function interfaces to the adapter which utilize fixed window assignments.

Figure 4:
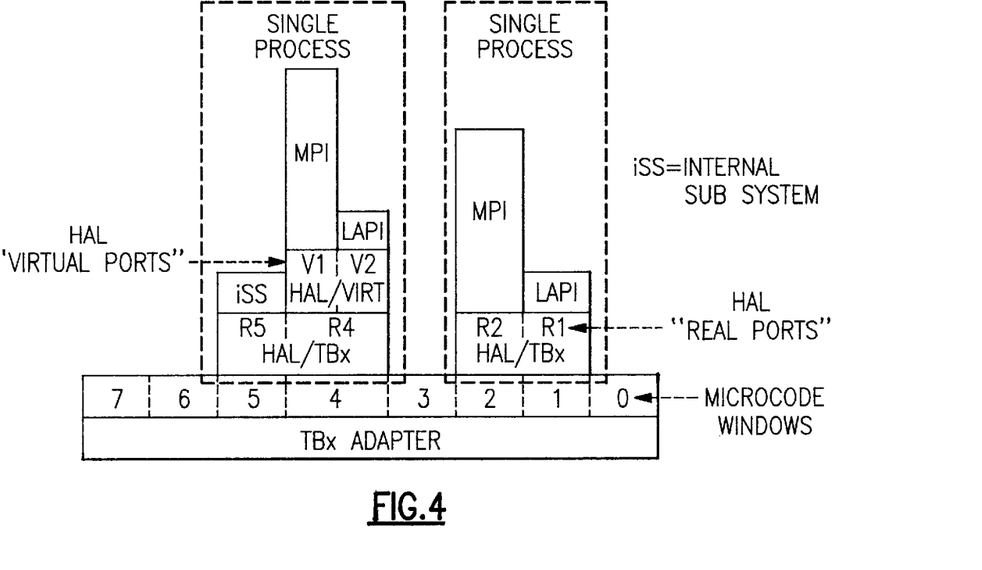
FIG. 4 is another embodiment of a node configuration of a node of the system of FIG. 1.

Another embodiment of a node configurations is shown in FIG. 4. All protocol stacks utilize the HAL interface which provides additional functionality, flexibility and portability.

HAL Functions and Architectural Attributes

HAL functions

We provided the following functions: setup (hal__init, hal__term), device memory management (hal__dmavail, hal__dmalloc, hal__dmfree), communication channels management (hal__open, hal__close, hal__qenv), send packets (hal__wpkt, hal__writepkt, hal__writenpkts), receive packets (hal__readhdr, hal__readpkt, hal__readnpkts), monitor status of fifos (hal__availspace, hal__newpkts) and notification (hal__notify, hal__register).

Implementation Notes

Opaque Objects partition__id

The partition__id argument on the hal__open call is expected to be a handle to job partition information and obtained from the environment. In some cases, such as user-space TBx, this partition information may not be directly managed by the calling user process. Instead, it may be managed by protected kernel services.

For user-space TBx, the partition information includes the logical task number of the calling process and a mapping of all logical tasks to switch__addressXpartition__keyXadapter__window, where switch__address is physical switch address of the node where the logical task is executing, partition__key is a unique value used by the adapter to filter spurious packets, and adapter__window is the physical adapter port assigned to the logical task. Also, the partition information identifies the logical task number of the calling process.

When virtual ports are provided, multiple virtual ports may be sharing a single "real" port. To facilitate this multiplexing, an implementation will at least have to provide in the partition information the logical task number of the calling process and a mapping from all logical task numbers to real__logical__taskXvirtual__port__id, where, real__logical__task identifies the destination within the context of the "real" port and virtual_port_id selects the destination virtual port.
port_id The port_id argument may also used as a handle to an opaque object which contains the local logical task number, the number of tasks in the partition, and, optionally for virtual ports, the device specific function pointers for the "real" port. At hal_open time, it is expected that logical task number and the number of tasks is obtained using the partition_id argument and the device specific function pointers are obtained using the realport_id argument.

Multiple Protocol Support

Multiple Protocol support allows the tasks within a parallel job to be communicating using more than one type of communications path protocol. A simple example of this is a 3-way parallel job in which Task 0 and Task 1 run on separate SP nodes connected via a switch adapter and Task 2 runs on a workstation connected via a common network adapter using UDP/IP protocol. Task 0 and Task 1 exchange messages through the more efficient switch packet protocol. Task 2 exchanges messages with both Task 0 and Task 1 through the UDP/IP path. HAL provides a common abstraction of both communication devices (switch adapter and UDP).

The HAL interface provides the "Data Link" communications layer. What is needed to support multiple protocols is a "Network" communications layer above the "Data Link" layer. Therefore a layer above HAL, e.g., LAPI, would provide the "Network" function. What HAL does provide to support the Multiple Protocol function is the capability to instantiate multiple HAL instances, one for each device type (e.g., TB3, UDP). For each task in the parallel partition the partition table includes a device type field. The job-management/scheduler function (this is a system wide mechanism outside of HAL or LAPI) loads this table onto the nodes, including the workstation node. Each node's table contains device type entries which are resolved based on the communication path (Data Link) device which is both resident on the node and allocated to the parallel job (see example below).

The next step (done by the network function) takes this single table and constructs N tables, one for each of the device types. These lower level tables are passed to the hal_open function calls (each unique device type will require a separate port to be opened).

In the network layer, to multiplex between the various protocol paths, there needs to be a table which maps the destination tasks to their associated HAL function set and port number.

In the simple example stated above the following tables are constructed:

| Task 0 | Partition Table | Task | Device |
|---|---|---|---|
| | | T0 | TB3 |
| | | T1 | TB3 |
| | | T2 | UDP |
| | Low Level Table-A to open HAL-TB3 port | Task | Device |
| | | T0 | TB3 |
| | | T1 | TB3 |
| | | T2 | |
| | Low Level Table-B to open HAL-UDP port | Task | Device |
| | | T0 | |
| | | T1 | UDP |
| | | T2 | UDP |
| | HAL functions: fta = hal_init(TB3); | | |
| | port_a = fta->hal_open(Table-A); | | |
| | ftb = hal_init(UDP); | | |
| | port_b = ftb->hal_open(Table-B); | | |
| | Network Table | Task | fn_ptr | Port |
| | | T0 | fta | port_a |
| | | T1 | fta | port_a |
| | | T2 | ftb | port_b |

Task 1 Partition Table Task Device

| Task 1 | Partition Table | Task | Device |
|---|---|---|---|
| | | T0 | TB3 |
| | | T1 | TB3 |
| | | T2 | UDP |
| | Low Level Table-A to open HAL-TB3 port | Task | Device |
| | | T0 | TB3 |
| | | T1 | TB3 |
| | | T2 | |
| | Low Level Table-B to open HAL-UDP port | Task | Device |
| | | T0 | |
| | | T1 | UDP |
| | | T2 | UDP |
| | HAL functions: fta = hal_init(TB3); | | |
| | port_a = fta->hal_open(Table-A); | | |
| | ftb = hal_init(UDP); | | |
| | port_b = ftb->hal_open(Table-B); | | |
| | Network Table | Task | fn_ptr | Port |
| | | T0 | fta | port_a |
| | | T1 | fta | port_a |
| | | T2 | ftb | port_b |

Task 2 Partition Table Task Device

| Task 2 | Partition Table | Task | Device |
|---|---|---|---|
| | | T0 | UDP |
| | | T1 | UDP |
| | | T2 | UDP |
| | Low Level Table-A to open HAL-UDP port | Task | Device |
| | | T0 | UDP |
| | | T1 | UDP |
| | | T2 | UDP |
| | HAL functions: fta = hal_init(UDP); | | |
| | port_a = fta->hal_open(Table-A); | | |
| | Network Table | Task | fn_ptr | Port |
| | | T0 | fta | port_a |
| | | T1 | fta | port_a |
| | | T2 | fta | port_a |

Multiple Protocol support provides a powerful advantage to the job scheduler function of the SP system. N-way parallel User Space jobs should always be immediately started, even when the User Space window resource was not available on N-nodes. Nodes where the User Space window was not available could be specified (in the Partition table) to run their respective tasks using the (always available) UDP device path. Subsequently, as windows free up on these nodes, the job scheduler would substitute the direct switch adapter device path (User Space window) for the UDP device. Over time, as the job runs, the scheduler would continue to allocate freed-up windows to the N-way job until it had accumulated N-windows.

The same dynamic partitioning function capability, which supports an initial N-way job to shrink to (N-i)-way and grow to (N+j)-way job, should in the general case support an N-way job having an initial protocol mix (device mix) being dynamically changed to a N-way job having a different protocol mix. The way this is envisioned to work for LAPI is that LAPI will provide interface functions which allow the job management/scheduler function to first quiesce message traffic and close the HAL ports, reload new partition tables, and then redo lapi_init (which uses the new partition table to determine which HAL device to initialize and which HAL port to open).

The job management/recovery mechanism also benefits from the Multiple Protocol capability. This simply works in the inverse way of the job scheduler start-up function. If a communication path (e.g., User Space window) connection fails it can be replaced by another path which may or may not use the same device and device type. In the case of two adapters, the connection could be replaced by a window on the second adapter or, if that is not available, it could be replaced by a UDP device connection. Again the sequence is the same: quiesce the message traffic, close the path (HAL port), load a new partition table, reinitialize (HAL), open the new communications path (HAL port), and resume message traffic.

Notification

```
/* The following pseudo code illustrates a possible imple-
mentation of
 * the notification mechanism: this implementation
   assumes that a thread
 * is created for each hal instance to handle the notifica-
   tions for all
 * ports opened on that instance. (NOTE: Another possible
   implementation is
 * to create a thread for each port that is opened—we
   should evaluate * the tradeoffs of these two methods).
/
    /* First the set of functions that need to go into the kernel
extension:
 * (1) A second level interrupt handler (slih is called
tbx_intr) called
 * by the kernel when it gets an interrupt from the adapter.
 * The mechanisms for registering the slih with the kernel
are beyond
 * the scope of the discussion here.
 * (2) A system call (register_slih) that enables HAL
instances to register
 * "handlers" with the slih. Note although our example
   shows a handler
 * which uses the et_post mechanism, it could very well
   be any other
 * mechanism such as those that cause a signal (for
   instance SIGIO), . . .
 * (3) The handler registered through the system call itself
is part of the
 * kernel extension (in our example it is called lapi_
instance_notify).
 * (4) A system call (hal_wait_and_get) that in addition
to calling et_wait
 * will also return some parameters to the caller.
 * (5) A system call to associate a thread with a hal instance
 * (called associate_hal_instance_to_thread).
 * (6) A system call to associate a window of the device
with the hal instance
 * (called associate_hal_win_to_instance).

/
    register_slih(uint win, uint class, void
    *kernel_to_user_notifer) {
      /* ... */
      slih_hndlr_tbl*win**class* =
    kernel_to_user_notifier;
      /* ... */
    }
    associate_hal_instance_to_thread(uint hal_instance,
    uint thread_id)
    {
      /* ... */
      thread_map_tbl*hal_instance* = thread_id;
      /* ... */
    }
    associate_hal_win_to_instance(uint win, uint
    hal_instance)
    {
      /*... */
      instance_map_tbl*win* = hal_instance;
      /* ... */
    }
    tbx_intr()
    {
      /* ... */
      ping the adapter to find if it was a send or a
      receive interrupt (class);
      ping adapter to identify the window that caused
      the interrupt (win);
      /* call the registered handler */
      *(slih_hndlr_tbl*win**class*)(win, class); /*
      depending on win and class
                ** lapi_instance_notify
                is called
                ** from here
                */
      /* ... */
    }
    lapi_instance_notify(uint win, uint class)
    {
      /* ... */
      hal_instance = instance_map_tbl*win*;
      /* construct the return parameters */
      if(space_available_in_return_param()) {
      /* we need to do this to take care of many
      windows/ports belonging to
      ** the same hal instance causing interrupts
      (before they have been
      ** serviced - so need to save state);
      */
      return_param*tail*.win = win;
      return_param*tail++*.class = class;
      }
      et_post(thread_map_tbl*hal_instance*);
      /* ... */
    }
    hal_wait_and_get()
    {
      /* ... */
      if(ret_val = items_in_return_param()) {
      /* interrupts from different windows of the same
      hal instance
      ** arrived before they were serviced
      */     return(ret_val);
      }
      et_wait();
      ret_val = return_param*head++*;
      return(ret_val);
    }
    /* The following functions are part of the HAL lilbrary
    */
    hal_init(uint dev, uint *max_pkt_sz, uint *frag_sz,
    uint min_alloc_sz, unit *func_struc)
    {
      /* ... */
      create thread that starts executing
      hndlr_thread();
      thread identifier associated with this newly
      created thread ht_id;
      /* inform the kernel extension of the association
      of ht_id with
      ** this hal_instance
      */
      associate_hal_instance_to_thread(hal_instance_id,
      ht_id);
```

-continued

```
    /* ... */
}
hal_open(....)
{
    Since this was a function returned by hal_init
    this function knows the hal_instance it is
    associated with - register
    associate_hal_win_to_instance()
}
hal_register(uint port_id, uint class, void
*user_provided_handler)
{
    /* ... */
    hal_instance_state.handlr*port_id**class* =
    user_provided_handler;
    /* the port_id has to encode the window or
    maintain a table that
    ** maps port_id to window - all part of the state
    of this hal instance
    */
    win = find_win(port_id);
    register_slih(win, class, lapi_instance_notify);
    /* maintain state for calling the user handler */
    hal_instance_usr_hndlrs*win**class* =
    user_provided_handler;
    /* ... */
}
hndlr_thread()
{
    /* ... */
    while() {
        ret_val = hal_wait_and_get();
        port_id = find_port(ret_val.win);
        /* call the user handler with the port id and
        class as the parameters */
        *(hal_instance_usr_hndlrs*win**class*)(port_id,
        class);
    }
}
```

Execution Model

A node in our system may contain multiple processors as well as multiple adapters. Each communication adapter supports some fixed number of ports/windows based on its hardware characterastics and the buffering capacity dedicated to it. HAL, as the name suggests, is designed to provide a common interface to the various communication devices resident on a node to the several processes of the node. (In particular the HAL design can be used to provide multiple processes with user space access of a specific communication adapter). A user/process can invoke multiple HAL instances—typically each of the instances would be used to access a different device type (e.g. TBMX, and AdapterX). We also expect the kernel to instantiate HAL's if it needs to offer services (such as IP or shared memory) based on the communications devices controlled by HAL. The HAL model works by allowing the adapter to interface with the system through send/recv packet fifo buffers associated with each port.

A process that wants to use the communications device creates an instance of HAL for the device. (A single process can have multiple instances of HAL on the same device.) Once HAL has been instantiated, the user gets access to a set of functions that control access to the device. These include functions to open a port, allocate device specific memory, communication functions, etc. The user process can now open port(s) on the device through HAL. These port(s) are then used for communication. The user requests a set of nodes from the environment (outside of HAL) for each protocol stack. The set of nodes returned by the environment is encapsulated in what is called a partition. For each partition the user requested, the user opens a port and associates the partition with that port. The creation of the HAL instance on a node and the opening of ports on that instance are local (i.e., not collective) operations. Ensuring that other nodes in the partitions have also completed their HAL initialization/opening ports is external to HAL. As part of opening a port the user process must associate some device specific memory (for the network send/recv packet fifos) for the port.

Multiple threads using the same port through HAL must synchronize outside of HAL. The HAL functions themselves do not do any locking. Multiple threads using different ports do not require any synchronization. For example, a single process can have a port for LAPI and a port for MPI.

Interactions with the Job/Partition Manager: A user negotiates with the job/partition manager for getting access to ports on a communication device.

Resource allocation and policy decisions are external to HAL and are managed by the job manager. The process communicates its resource requirements through mechanisms provided by the job manager. (In our current implementation the requirements are specified (implicitly) by choosing either user space or IP for communication.) We expect the job manager to load the appropriate partition table(s) corresponding to the requested resources into the kernel of the nodes in the partition using a HAL interface function (in our current CSS library, the routine JM_distribute_PT provides this functionality).

Interactions with the communication device: When an instance of HAL is created, the device specific functions (for e.g. readpkt_tb2, writepkt_tb2, etc.) that map to the corresponding HAL functions (hal_readpkt, hal_writepkt) are returned along with other parameters (for e.g. max_pkt_size, max_frame_size, etc.) associated with the device. The functions returned also include a function for management of device specific/DMA memory. At port open time HAL loads the partition table (obtained from the job manager) onto the adapter through kernel extension calls (in our current CSS library the kernel extension open_client provides this functionality). On an interrupt, the device driver sends a signal to the appropriate HAL instance. See the following example pseudo code for a possible notification mechanism.

An Example Using the HAL Interface

Consider a node that has two adapters (say TBMX and AdapterX). Assume that the number of physical ports/windows supported on each of these adapters is 4 and 8 respectively. In our example the user wants to use 3 virtual ports and one physical port. The physical port intended for use is on TBMX (this corresponds to R1 in FIG. 5. One of the three virtual ports (V3) is mapped to a physical port (R11) on AdapterX. The other two virtual ports (V1 and V2) are mapped on to the same physical port (R0) on TBMX. Note that a user while requesting these ports does not know the ports being assigned. The port numbers being used in the example were the ones returned by the partition manager. The partitions specified for V1 and V2 are different (however they have to be "subsets of/equal to" the partition of the physical port on to which they map partition corresponding to R0). The partition used in the case of V3 is the same as that used for the physical port (R11) on to which it maps.

Figure 5:
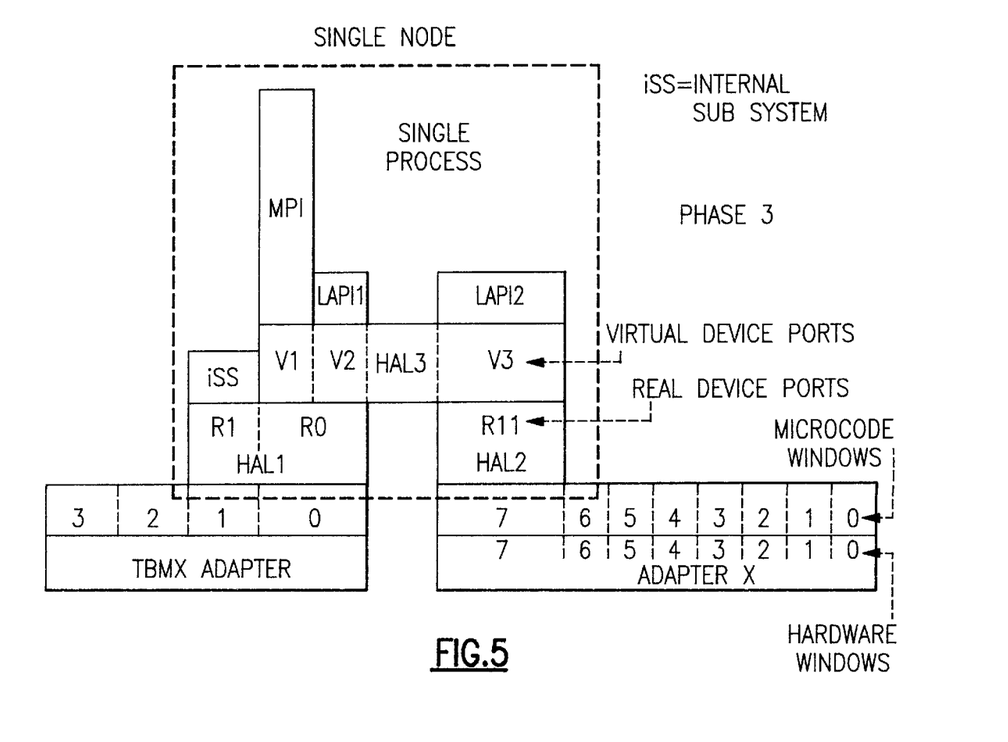
FIG. 5 is another embodiment of a node configuration of a node of the system of FIG. 1 wherein the node has two adapters connecting the node to the switch.

```
/* Assumptions:
* (1) The user has mechanisms to request one or more partitions. * (2)
Each task of the user job "knows" the set of partitions to
which it * belongs.
/
/* hal.h has defs for TBMX, AdapterX, Virtual, typedefs
for function_switch, * memory_handle
/
#include <hal.h>
function_switch *tbmx_func, *col_func, *vir_func;
unsigned int max_pkt_sz_tbmx, frag_sz_tbmx,
min_alloc_unit_tbmx; unsigned int max_pkt_sz_col,
frag_sz_col, min_alloc_unit_col; unsigned int
mas_pkt_sz_vir, frag_sz_vir, min_alloc_unit_vir; /* A
user of HAL writes a function similar to proto_init to
initialize * HAL and to enable communication on various
ports of each hal instance. /
proto_init()
{
   /* initialize the various HAL instances that we want
to use . The device information **(TBMX, AdapterX,
Virtual) is related to the partitions requested.     */
   stat = hal_init(TBMX, &max_pkt_sz_tbmx,
&frag_sz_tbmx, &min_alloc_unit_tbmx, &tbmx_func);
   stat = hal_init(AdapterX, &max_pkt_sz2_col,
&frag_sz_col, &min_alloc_unit_col, &col_func);
   stat = hal_init(Virtual, &max_pkt_sz3_vir,
&frag_sz_vir, &min_alloc_unit_vir, &vir_func);
   /* The following calls allocate device specific
memory which constitute the send and receive
   ** fifos. The user needs to use hal_dmavail to check
if there is sufficient memory available.
   ** req_sz_i includes the size of send fifo and
receive fifo; the size is possible some function
   ** of number of nodes in partition_id_i,
max_pkt_sz_i (and maybe frag_sz_i and
min_alloc_unit_i).
   */
   req_sz_tbmx_p1.sendsize = ... ;
   req_sz_tbmx_p1.recvsize = ... ;
   mem_hndl_tbmx_p1 = tbmx_func-
>hal_dmalloc(req_sz_tbmx_p1);   req_sz_virl.sendsize =
... ;
   req_sz_virl.recsize = ... ;
   mem_hndl_virl = vir_func- >hal_dmalloc(req_sz_virl);
   req_sz_vir2.sendsize = ... ;
   req_sz_vir2.recvsize = ... ;
   mem_hndl_vir2 = vir_func- >hal_dmalloc(req_sz_vir2);
   req_sz_col_p1.sendsize = ... ;
   req_sz_col_p1.recvsize = ... ;
   mem_hndl_col_p1 = col_func-
>hal_dmalloc(req_sz_col_p1); req_sz_vir3.sendsize = ...
;
   req_sz_vir3.recvsize = ... ;
   mem_hndl_vir3 = vir_func- >hal_dmalloc(req_sz_vir3);
   req_sz_col_p2.sendsize = ... ;
   req_sz_col_p2.recvsize = ... ;
   mem_hndl_col_p2 = col_func-
>hal_dmalloc(req_sz_col_p2); /* At this point memory
has been allocated for each of the ports that ** the
user wants to open.
*/
/* get the partition id from the environment - since
the ** management of the partitions is outside of HAL -
assum that ** association of partition id to device is
known
*/
/* get a physical port on the tbmx adapter */
stat = tbmx_func- >hal_open(partition_id_tbmx_p1,
mem_hndl_tbmx_p1, &p_port1, null);
/* use the physical port returned above to initialize
the two ** virtual ports we want mapped on to physical
port p_port1 */
stat = vir_func- >hal_open(partition_id_vir1,
mem_hndl_virl, &v_port1, p_port1); stat = vir_func-
>hal_open(partition_id_vir2, mem_hndl_vir2, &v_port2,
p_port1); /* open the physical port (p_port2) on col
adapter and the ** virtual port (v_port3) that maps to
it
*/
stat = col_func- >hal_open(partition_id_col_p1,
mem_hndl_col_p1, &p_port2, null);
stat = vir_func- >hal_open(partition_id_col_p1,
mem_hndl_vir3_p1, &v_port3, p-port2);
/*open aonther port on col that will be directly used
... */ stat = col_func- >hal_open(partition_id_col_p2,
mem_hndl_col_p2, &p_port3, null);
/* At this point we have opened the ports referred to
in the ** example. R1 in the figure illustrating the
example maps to
   ** p_port1, R3 maps to p_port3, R4 to p_port3, V1 to
v_port1,    ** V2 to v_port2, V3 to v_port3.
   */
} /* end of user_init */
```

Description of the HAL API

HAL functions

HAL contains all the functions that abstract the underlying network (adapter) hardware. It is expected that initially this interface will not be exposed to application programmers and will be used only by internal subsystems. All protocol stacks are to be built on top of HAL. The HAL interface is constant across adapters, minimizing the impact on upper layer protocol stacks as the underlying hardware evolves.

We provided the following functions: setup (hal_init, hal_term), device memory management (hal_dmavail, hal_dmalloc, hal_dmfree), communication channels management (hal_open, hal_close, hal_qenv), send packets (hal_wpkt, hal_writepkt, hal_writenpkts), receive packets (hal_readhdr, hal_readpkt, hal_readnpkts), monitor status of fifos (hal_availspace, hal_newpkts) and notification (hal_notify, hal_register).

Setup Functions

The initialize function (hal_init) is required to initialize the HAL layer for a device and get a handle on the functions that are used to access the device, and to obtain the device specific characteristics. The terminate function (hal_term) is required to terminate the HAL environment for the node. The HAL instance can be used to open communication channels available on the device called "ports" (referred to physical/real ports). In addition to physical devices that HAL supports, HAL provides a mechanism to multiplex communication channels over real port(s) through a virtual HAL device.

In such cases HAL may add headers to enable this multiplexing. Using the virtual HAL layer will impact performance in several ways like, a) an extra copy may be required from the fifo associated with the physical port to the fifo associated with the virtual port, b) multiplexing over a real port has the overhead of having to add header information and decoding it, and c) introducing an additional layer in the protocol (function overhead). Although providing the virtualizing capability impacts performance, this mechanism allows multiple virtual channels (tradeoff between function and performance). Note that no overhead is added to the protocol path in the case when only real ports are used (by having the virtualizing capability).

Device Memory Management

Device memory is the space through which the user sends and receives packets. In the case of real ports, this memory could be on the device (adapter), or on the system side. If it is on the system side the memory must be pinned to allow DMA (Direct Memory Access) operations from the adapter. Depending on the implementation device memory for virtual ports may or may not be pinned.

The device memory is conceptually partitioned into send and receive fifos. The user can check the availability of device specific memory (using hal_dmavail). Based on the availability the user of HAL can allocate memory (hal_dmalloc) to be used with a port. This memory can be returned to HAL once a port is closed (hal_dmfree).

Communication Channel Management

A port associated with a partition has to be opened using hal_open to enable this node to establish a communication channel with other nodes belonging to this partition (via the port). The number of tasks in the partition and the relative id of this task in the partition can be queried using hal_qenv. An open port that is no longer in use can be closed using hal_close.

Sending and Receiving Packets

For performance reasons we made the following decisions:

Avoiding Copies: In order to avoid copies on the sending side, we allow the interface to provide the header and data separately. This allows the HAL interface to copy data directly from the users buffer to the network send fifo. On the receiving side, the interface allows reading the header of the incoming packet (hal_readhdr) and then calling a whereto function which allows the user to determine the final destination of the data without an intermediate copy.

Concurrency: The send and receive functions are non-blocking to enable overlap of computation and communication.

Multiple Function Calls:

Provision of separate functions (hal_wpkt, hal_writepkt, hal_writenpkts for the send side and hal_readpkt and hal_readnpkts on the recv side) for single packets and multiple packets. This ensures that for multiple packets HAL doesn't incur the extra function call overhead. For single packets there is no overhead of checking an extra parameter.

Two functions for sending a single packet were defined. For one (hal_wpkt), the user specifies only the data, and for the second (hal_writepkt), the user specifies the header and the data.

Error Checking: HAL does not guarantee the delivery of any packet. However, HAL does guarantee that any packet delivered is what was sent.

To monitor fifo utilization, we have functions which allow users to check the amount of space available (hal_availspace) to send packets, and check the number of new packets that have arrived in the receive fifo (hal_newpkts).

We also made the following design decisions:

We decided that the software header used in write packet should provide the length which is parsed by the hal_readhdr function to extract the length. We decided that we should not require of HAL to provide the packet length to the receiving end and that this could easily be done by the upper layers.

We decided not to expose the route selection. Route selection is hardware specific and hence should not be exported to users.

Notification

Due to the nonblocking nature of HAL, there is need for sending notification (send is complete locally). For asynchronous reception of messages there is need for receiving notification on the receiving node. The registration function (hal_register) allows the user to register a handler that must be invoked on notification. The function hal_notify can be used to enable notification.

If the port specified in hal_notify is a virtual port and notification (interrupt) is enabled, both the virtual port and its associated "real port" could be set to interrupt mode. In an implementation where the real port's notification is enabled, if a virtual port is changed from interrupt mode to polling mode, and all other virtual ports are currently in polling mode, then both the virtual port specified and its associated real port will be changed to polling mode. Otherwise, if there remains at least one virtual port in interrupt mode the associated real port remains in interrupt mode.

Following is a list of HAL Functions and their definitions usable with HAL of the present invention. These functions will be understood by those skilled in the art for use in the present implementation of HAL.

Setup Functions
Initialize the Hardware Abstraction Layer
hal_init Function
Purpose initialize a HAL instance for a specific communications device.

Syntax include <hal.h>
int hal_init(dev, max_pkt_sz, frag_sz, min_alloc_sz, func_struc) hal_dev_t   dev;
    uint    *max_pkt_size;
    uint    *fragsz;
    uint    *min_alloc_sz;
    hal_func_t*func_struc;

Parameters

| | |
|---|---|
| dev - IN | The identifier of the switch adapter device type. As defined in hal.h header file. |
| max_pkt_sz - OUT | The size in bytes of the largest packet which can be written. |
| max_frag_sz - OUT | The size in bytes of the largest switch network packet (max network packet data payload). |
| min_alloc_sz - OUT | The minimum send/receive fifo space allocated for any packet. |
| func_struc - OUT | The structure of pointers to device specific HAL functions. |

Description

The hal_init function initializes the HAL node environment for a specific requested communications device type (dev). Characteristics of this device are returned: maximum packet size which can be written, fragment size which will be transferred through the network (i.e., switch packet size), minimum space needed in send/receive fifo for a single switch packet, and a structure of pointers to HAL functions which have specific device dependencies. The upper-layers/users call hal_init function for each device type which the process uses. When an attempt is made to initialize a HAL device which is already in the active state, hal_init will simply return the three size parameters and the func_struct pointers (the device interface will not be re-initialized). Device type "Virtual" is a universal type which is used in conjunction with the a separate HAL instantiation of any one real device (e.g., TB2) to create virtual ports. Virtual ports are created and mapped to the real port with the hal_open function.

Return Values

HAL_SUCCESS—on successful completion.

The following can be returned on error:

HAL_ERR_UNKNOWN_DEVICE—Not supported device.
Related Information
hal_term, hal_open, hal_close.

---

Terminate the HAL layer
hal_term Function
Purpose

Terminate a HAL instance to a specific communications device.
Syntax    #include <hal.h>
   int hal_term(dev)
     hal_dev_tdev;
Parameters

| | |
|---|---|
| dev - IN | The identifier of the switch adapter device type. As defined in hal.h header file. |

Description

The hal_term function terminates the HAL node environment for a specific requested communications device type (dev). All ports associated with this device are closed and all allocated port device memory is freed before terminating the device HAL interface.
Return Values    HAL_SUCCESS - on successful completion.
   The following can be returned on error:
   HAL_ERR_UNKNOWN_DEVICE - Not supported device.
Related Information    hal_init, hal_open, hal_close.
Communication Channels Management
Open a Port
hal_open Function
Purpose    open a communications path port ("open the pod doors HAL":-)
Syntax    #include <hal.h>
   int hal_open(part_id, mem_handle, port, realport)
    partition_info_t*part_id;
    mem_handle_t
    mem_handle;
    uint    *port;
    uint    *realport;
Parameters

| | |
|---|---|
| part_id - IN/OUT | Pointer to partition_info_t structure that contains partition info. |
| mem_handle - IN | This is a handle to a structure of allocated port fifos. |
| port - OUT | The ID of the new port which has been opened. |
| realport - OUT | Optional: The ID of an existing open "real" port. |

Description

The hal_open function opens a HAL communications port. It is required that the parallel partition was established via a global job manager prior to calling this function and that the partition table has been loaded onto the node. This function returns the port ID which has been assigned to this task in the partition table and associates the allocated memory area with this port.

In the case of hal instance corresponding to a virtual device, the realport parameter is required (in other cases, if it is passed in it is ignored). The real port needs to have been previously opened with the hal_open function invoked using the function pointer returned with the hal_init of the real device and without the realport parameter. The hal_open for the virtual port uses the unique function pointers returned with the instantiation of the Virtual HAL device. The realport is a handle which allows the virtual port device functions to be associated with the functions needed by HAL to interface to the underlying real port device.

---

The partition_info_t looks as follows and needs to be filled in:
```
typedef struct {
int   p_id;    /* IN - Partition ID info for KE */
int   win_id;  /* IN - Window ID of adapter to use
                      - for KE */
int   hndl;    /* IN - Handle from upper layer
                      (i.e. LAPI) */
                /* to map HAL port to correct upper
                   layer */
task_t task_id; /* IN - Task ID for this job */
task_t num_tasks; /* IN - Number of tasks in this
                          job */
HAL_error_hndlr*err_hndlr;  /* IN - HAL user
                              registered error handler
                              */
void  *intr_attr; /* IN - Interrupt thread
                         attribute {} */
int   user_buf_start;/* OUT - Shared memory start
                              location */
                      /* if the memory was
                         allocated */
int   user_buf_size; /* IN/OUT - Input size
                                 requested and get */
                      /* back the actual memory
                         size allocated */
int   tmp1;           /* Reserved for future
                         use */
int   tmp2;
int   *tmp_ptr1;
int   *tmp_ptr2;
}     partition_info_t;
```
Return Values    HAL_SUCCESS - on successful completion.
   The following can be returned on error:
   EBUSY - System error - Previous job still running.
   EINVAL - System error - Invalid argument.
   EPERM - System error - Caller not authorized to perform the action.

| | |
|---|---|
| ETIMEDOUT - System error - | Switch network is not up. |
| ENODEV - System error - | Adapter type and library do not match. |
| ENOSPC - System error - | Can not attach to bus memory - out of memory or segment register. |
| CSS_KE_INTERNAL_ERROR - | System error - Kernel extension internal memory management failed. |
| CSS_KE_UCODE_ERROR - | System error - Adapter micro code is not responding. |
| HAL_ERR_OPEN_FAILED - | Opening of communication device failed. |

Related Information hal_close, hal_init, hal_term.

---

Close an open port
hal_close Function
Purpose close a communications path port.
Syntax

#include <hal.h> int hal_close(part_id, port) partition_info_t*part_id;
uint port;

Parameters part_id—IN Pointer to partition_info_t structure that contains partition info. port—IN The ID of the port to be closed.

Description

The hal_close function closes a HAL communications port. Memory buffers which had been allocated and associated to this port remain allocated but are now disassociated from this port. These buffers are available to be use by subsequently opened ports or they can now be freed. Closing a real port, which is being used by virtual ports, will force all the virtual ports to be closed.

Return Values

HAL_SUCCESS—on successful completion.

The following can be returned on error:
EINVAL—System error—Invalid argument.
EPERM—System error—caller not authorized to perform the action.
HAL_ERR_CLOSE_FAILED—Close of communication device failed.
HAL_ERR_BAD_PARAMETER—Invalid parameter passed in.

Related Information hal_open, hal_init, hal_term.

---

Port Environment Query Function
hal_qenv Function
Purpose query the HAL interface for partition information Syntax

```
#include <hal.h>
int hal_qenv(port, part_id, my_taskid, num_tasks)
    uint   port;
    partition_info_t*part_id;
    uint   *my_taskid;
    uint   *num_tasks;
```

Parameters

| | |
|---|---|
| port - IN | The ID of the port for which environment information is queried. |
| part_id - IN | Pointer to partition_info_t structure that contains partition info. |
| my_taskid - OUT | The ID within the partition of the task executing this call. |
| num_tasks - OUT | The total number of tasks in the job. |

Description

The hal_qenv function queries the HAL interface for information about a specific port. The partition id and logical task id associated with the port, and the number of tasks in the partition are returned. The port specified can be either a real or virtual HAL port.

Return Values

HAL_SUCCESS - on successful completion.
The following can be returned on error:
HAL_ERR_BAD_PARAMETER - Invalid parameter passed in.

Related Information hal_open.

Basic Data Transfer Calls

Read the Header of an Incoming Packet hal_readhdr Function
Purpose

Read the header of a packet from the network receive fifo (without updating pointers or consuming any part of the message).

Syntax

```
#include <hal.h>
int hal_readhdr(port, buf, len, pkt_len)
    uint port;
    void *buf;
    uint hlen;
    uint *pkt_len;
```

Parameters

| | |
|---|---|
| port - IN | The identifier of the port being used for communication. |
| buf - OUT | A pointer to the user buffer where the requested bytes will be copied. |
| hlen - IN | The number of bytes that have to be copied from the packet at the head of the receive fifo. |
| pkt_len - OUT | The number of data bytes in the packet. |

Description

The hal_readhdr function attempts to read "hlen" bytes from the beginning of the first packet available in the receive fifo associated with "port". The "hlen" bytes are copied into the user buffer pointed by "buf". Presumably "hlen" corresponds to the length of the header, so that the header information would be returned to the caller. The pointers corresponding to the fifos within HAL remain unchanged—i.e. no part of the message is actually consumed. Repetitive calls to hal_readhdr (without any intervening calls to any other functions and passing the same parameters) will return the same results into buf if there was any packet available in the receive fifo associated with the port. If "hlen" is greater than MAX_PKT_SIZE, only MAX_PKT_SIZE bytes will be copied into buf. If port has not been previously initialized and opened, the function returns 0 to indicate no packets are read.

Return Values

On successful completion the hal_readhdr function returns 1.

If there are no packets available in the receive fifo, hal_readhdr returns 0.

Related Information hal_newpkts, hal_open, hal_readpkt.

Read the Header of an Incoming Packet
hal_peek Function
Purpose

Read some data of a packet from the network receive fifo (without updating pointers or consuming any part of the message).

Syntax

```
#include <hal.h>
int hal_peek(port, buf, offset, hlen, pkt_len)
    uint port;
    void *buf;
    uint offset;
    uint hlen;
    uint *pkt_len;
```

| Parameters | |
|---|---|
| port - IN | The identifier of the port being used for communication. |
| buf - OUT | A pointer to the user buffer where the requested bytes will be copied. |
| offset - IN | The offset from which data is to be read. |
| hlen - IN | The number of bytes that have to be copied from the packet at the head of the receive fifo. |
| pkt_len - OUT | The number of data bytes in the packet. |

Description

The hal peek function attempts to read "hlen" bytes from "offset" bytes after the beginning of the first packet available in the receive fifo associated with "port". The "hlen" bytes are copied into the user buffer pointed by "buf". Presumably "hlen" corresponds to the length of additional headers, so that the additional header information would be returned to the caller. The pointers corresponding to the fifos within HAL remain unchanged—i.e. no part of the message is actually consumed. Repetitive calls to hal_peek (without any intervening calls to any other functions and passing the same parameters) will return the same results into buf if there was any packet available in the receive fifo associated with the port. If "hlen" is greater than MAX_PKT_SIZE, only MAX_PKT_SIZE bytes will be copied into buf. If port has not been previously initialized and opened, the function returns 0 to indicate no packet headers are read. The hal_peek function can be called multiple times for the same packet with different offset and different length ("hlen").

Return Values

On successful completion the hal_peek function returns 1.

If there are no packets available in the receive fifo, hal_peek returns 0.

Related Information hal_newpkts, hal_open, hal_readpkt.

Read a Packet from the Network
hal_readpkt Function
Purpose

Read a packet from the network receive fifo.
Syntax

```
#include <hal.h>
int hal_readpkt(port, buf, hdr_len, pkt_len)
uint port;
void *buf;
uint hdr_len;
uint pkt_len;
```
Parameters

| | |
|---|---|
| port - IN | The identifier of the port being used for communication. |
| buf - OUT | A pointer to the user buffer where the requested bytes will be copied. |
| hdr_len - IN | The number of bytes to skip from the beginning of the packet at the head of the receive fifo before copying the data into buf. |
| pkt_len - IN | The number of bytes that have to be copied into buf. |

Description

The hal_readpkt function attempts to read pkt_len bytes from the first packet in the receive fifo associated with port after skipping over hdr_len bytes from the beginning of that packet. The pkt_len bytes are copied into the user buffer pointed by buf.

After the call to hal_readpkt the message is considered to be consumed and HAL frees the space corresponding to the just read message in the receive fifo (and updates the appropriate fifo pointers). If hdr_len is greater than MAX_PKT_SIZE, no bytes are copied into the buffer. If (hdr_len +pkt_len) is greater than MAX_PKT_SIZE only (MAX_PKT_SIZE—hdr_len) bytes will be copied into buf. If port has not been previously initialized and opened, the return value indicates that no packets have been read.

Return Value

On successful completion the hal_readpkt function returns 1 (i.e. the number of packets read).

If there are no packets available in the receive fifo, hal_readpkt returns 0.

If the function is attempted on an uninitialized/unopened port, it also returns a 0.

Related Information hal_open, hal_newpkts, hal_readhdr.

Write a Header and Packet into the Network
hal_writepkt Function
Purpose

Allows a user to inject a single packet into the network.
Syntax

```
#include <hal,h>
int hal_writepkt(port, dest, nbufs, buf, len)
uint port;
uint dest;
uint nbufs;
void *buf*nbufs*;
uint len*nbufs*;
```
Parameters

| | |
|---|---|
| port - IN | The identifier of the port being used for communication. |
| dest - In | The logical destination node to which this packet must be sent. |
| nbufs - IN | The number of different data/hdr buffers that comprise the packet. |
| buf - IN | The pointer to each of the data/hdr areas. |
| len - IN | The length of each data/hdr to be sent to the dest. |

Description

The hal_writepkt function attempts to inject a single data packet into the network containing len*0*+ . . . +len*nbufs−1* number of bytes (where len*0*+ . . . +len*nbufs−1* should not be greater than the MAX_PKT_SIZE). The packet is constructed with len*0* bytes of header/data starting from the address pointed to by buf*0* followed by len*1* bytes of header/data starting from the address pointed to by buf*1* and so on. If there is no space (see hal_availspace) in the network fifo the packet is dropped.

Return Values

On successful completion the hal_writepkt returns 1 (implying that one packet was successfully sent into the network).

If there was no space in the network fifo, hal_writepkt returns 0.

Related Information hal_availspace, hal_open, hal_writepktc.

---

Write (continuous/cached) header and packet Packet into the Network
hal_writepktC Function
Purpose Allows the user to indicate that there are some additional packets to be injected into the network following this packet.

Syntax include <hal.h>
int hal_writepktC(port, dest, nbufs, buf, len)
  uint port;
  uint dest;
  uint nbufs;
  void *buf*nbufs*;
  uint len*nbufs*;

Parameters

| | |
|---|---|
| port - IN | The identifier of the port being used for communication. |
| dest - IN | The logical destination node to which this packet must be sent. |
| nbufs - IN | The number of different data/hdr buffers that comprise the packet. |
| buf - IN | The pointer to each of the data/hdr areas. |
| len - IN | The length of each data/hdr to be sent to the dest. |

---

Description

The hal_writepktc function attempts to inject a single data packet into the network. The data packet is a concatenation of the "nbufs" buffers indicated through buf. The number of bytes injected into the network is the sum of the lengths of each of the buffers; i.e., the number of user bytes injected into the network is len*0*+ . . . +len*nbufs−1* (This sum cannot be greater than MAX_PKT SIZE). If there is no space in the network fifo (see hal_availspace) the packet is dropped.

This function additionally provides a hint to hal to indicate that there are more packets to follow (i.e more hal_writepktc or at least one more hal_writepkt). If more packets do not follow, it may result in indefinite delay of injecting this particular packet into the network. Note that the expectation is that by indicating (by using hal_writepktc) that there are more packets to follow immediately following this calls, the HAL implementation may be able to do some optimizations.

Return Values

On successful completion the hal_writepktc returns 1 (implying that one packet will eventually be sent into the network).

If there was no space in the network fifo, hal_writepktC returns 0.

Note that if a 1 is returned it does not imply the packet will immediately be put into the network the delay in injecting the accepted packet could be indefinite, if it is not followed by a hal_writepkt. If hal_writepktc fails for some reason (e.g., port not opened) it returns −1.

Related Information hal_availspace, hal_open, hal_writepkt.

Fifo Monitoring Functions

---

Space Available To Send Packets
hal_availspace Function
Purpose

Returns the number of packets the network can accept.

Syntax include <hal.h>
int hal_availspace(port)
  uint port;

Parameters

| | |
|---|---|
| port - IN | The identifier of the port being used for communication. |

Description

This function checks the state of the network send fifo and returns the number of packets (of length up to MAX_PKT_SIZE) the network will accept at that time for transmission for the given port.

Return Values

On successful completion hal_availspace returns "n", where "n" denotes the number of packet slots currently free in the network send fifo for the port.

It returns 0 if there is no available space.

Related Information hal_writepkt, hal_writepktC, hal_open.

New Packets to Receive
hal_newpkts Function
Purpose

Returns the number of packets to be read from the network receive fifo

Syntax include <hal.h>
int hal_newpkts(port)
  uint port;

Parameters

| | |
|---|---|
| port - IN | The identifier of the port being used for communication. |

Description

This function returns the number of new packets that are available in the receive network fifo for the port.

Return Values

On successful completion the hal_newpkts returns "n", where "n" denotes the number of new packets in the network receive fifo for the port.

It returns 0 if no new packets have arrived.

Related Information hal_readhdr, hal_readpkt, hal_open.

Reset communication port for forked child processes.
hal_reset_child Function
Purpose Calls CSS (Communication SubSystem) KE function css_ke_reset_child() to close the communication port acquired from the parent as a result of a fork() call. This is only required if the parent had an open communication port before the fork() call and the child wants to open its own port to -continued

```
    join in the communication.
Syntax include <hal.h>
    int hal_reset_child(port)
        uint port;
Parameters port - IN           The identifier of the port being
                        used for communication.
Description This function should only be utilized if the child
    process of an active communication process (open
    port) wants to join in as another task and wants
    to open a port. The child process then needs to
    call hal_reset_child before hal_init and hal_open.
    By calling hal_reset_child it will close only the
    child's copy of the port acquired from the parent
    and reset HAL data structures so hal_init and
    hal_open calls can be made.
Return Values HAL_SUCCESS - on successful completion.
    The following can be returned on error:
    EINVAL - System error - Invalid argument.
Related Information hal_close, hal_open.
Notification
Specify Notification Behavior
hal_notify Function
Purpose Specify the port notification behavior.
Syntax include <hal.h>
    int hal_notify(port, fifo_type, mode, <threshold>)
        uint            port;
        fifo_t          fifo_type;
        notification_t  mode;
        uint            threshold;
Parameters port - IN           The ID of the port for which
                        notification behavior is being
                        specified.
    fifo_type - IN      Fifo Specification: SND_FIFO,
                        RCV_FIFO, etc.
    mode - IN           Notification mode: 0 =
                        Polling, 1 = Interrupt.
    threshold - IN      Interrupt threshold: 1 = 1
                        packet, n = after n packets or
                        timer interval in
                        milliseconds.
```

Description

The hal_notify function is used to set the notification behavior of a specific port. The receive and send port interface notification behaviors are independent and need to be specified separately. The default mode for both the send and receive interfaces is polling mode (interrupts disabled). The mode has meaning only if fifo_type is SND_FIFO or RCV_FIFO. If the fifo_type is WATCHDOG, the threshold refers to the timer pop interval in milliseconds. The hal_register function is used to specify (register) the interrupt handler to be used with the interrupt mode operation. It is an error to enable interrupts without having registered a handler for fifo of that port.

```
The fifo_t is defined as follows:
    typedef enum{
    SND_FIFO            /* Monitor Send FIFO */
    RCV_FIFO            /* Monitor Recv FIFO *
    WATCHDOG            /* Monitor Timer */
    FAULT_SERV          /* Monitor Switch Faults */
    LAST_INTR           /* Last Entry */
    } fifo_t;
The notification_t is defined as follows:
    typedef enum         {
    POLLING             /* Turn interrupts off */
    INTERRUPT           /* Turn interrupt on */
    }                   notification_t;
```

Implementation Notes

If the port specified is a "virtual port" and it is set to interrupt mode, both the virtual port and its associated "real port" will be set to interrupt mode. If a virtual port is changed from interrupt mode to polling mode, and all other virtual ports are currently in polling mode, then both the virtual port specified and its associated real port will be changed to polling mode. Otherwise, if there remains at least one virtual port in interrupt mode the associated real port remains in interrupt mode.

Return Values

HAL_SUCCESS—on successful completion.

The following can be returned on error:

HAL_ERR_BAD_PARAMETER—Invalid parameter passed in.

Related Information hal_register, hal_open.

```
Port Notification Handler Registration
hal_register Function
Purpose

Register a port notification handler.
Syntax include <hal.h>
    int hal_register(port, fifo_type, handler,
                hndlr_param)
        uint                port;
        fifo_t              fifo_type;
        usr_hndlr_thandler; void *hndlr_param;
Parameters port - IN           The ID of the port for which
                        notification handler is being
                        registered.
    fifo_type - IN      Fifo specification: SND_FIFO,
                        RCV_FIFO, etc.
    handler - IN        The function pointer
                        corresponding to interrupt
                        handler being registered for
                        this port abd fifo_type.
    hndlr_param - IN    Pointer to be passed to the
                        handler when it is invoked.
```

Description

The hal_register function is used to specify (register) the interrupt handler to be used for the interrupt mode operation. The receive and send port interface operations are independent and need to be specified separately. The user function specified by "handler" will be invoked, The handler param will be passed to the user handler. if notification corresponding to the fifo specified on port is enabled. This function is also used to register handlers for Timer

```
interrupts, fault service interrupts, etc. The
hal_notify function is used to enable and disable
interrupt mode.
The usr_hndlr_t function is declared as follows:
typedef void (*usr_hndlr_t)(uint, void *);
```
Return Values HAL_SUCCESS - on successful completion.
The following can be returned on error:
HAL_ERR_BAD_PARAMETER - Invalid parameter passed in.

Related Information hal_notify, hal_open.

While we have illustrated and described the preferred embodiment of our invention, it is to be understood that we do not limit ourselves to the precise construction herein disclosed, and the right is reserved to all changes and modifications coming within the scope of the invention as defined in the appended claims.

What is claimed is:

1. A method for communicating from a node to a communications device in a multinode network, the node having a user space and a Kernel space, and further comprising a communications protocol layer above said communications device, said method comprising:

creating an instance of a hardware abstraction layer (HAL) interface in the node, said HAL interface comprising a communications layer between the communications device and the communications protocol layer and providing for functions that control access to the communications devices from said user space in the node;

obtaining device specific characteristics from the communications device and a pointer pointing to access functions in said functions for accessing said communications device;

opening multiple ports on the communications device through the instance of said HAL interface using said functions; and sending messages between the node and the communications device using said access functions pointed to by said pointer, wherein the messages are optimized with respect to the communications device as determined by the obtained device specific characteristics, and said messages are communicated directly to said communications layer below said communications protocol layer thereby bypassing said Kernel space.

2. The method of claim 1 further comprising:

establishing a protocol stack to be used in sending messages between the node and the communications device;

requesting a set of nodes in the network of nodes, said set of nodes to be assigned to said protocol stack;

encapsulating said set of nodes into a partition; and said opening of multiple ports includes opening a port on the communications device and associating that port with said partition through said functions such that a single protocol stack is associated with a single port.

3. The method of claim 1 wherein said messages are packetized, and further comprising:

sending one packet of a message with a single function call of said instance of said HAL interface.

4. The method of claim 1 further comprising:

establishing multiple instances of the HAL interface in a single node, each instance having a separate set of ports to said communications device, each instance associated with a separate process on said node.

5. The method of claim 4 further comprising associating multiple ports with a single process on said node.

6. The method of claim 4 further comprising associating multiple virtual ports to a separate one of said ports in a single process.

7. The method of claim 6 further comprising associating a separate protocol stack to each virtual port such that multiple protocol stacks are associated with a single port.

8. The method of claim 4 further comprising:

sending a notification from an instance of the HAL interface to its associated process for both send and receive events in the communication of messages between said node and said communications device.

9. The method of claim 8 wherein said messages are sent in multiple packets and said receive notification is delivered after some specified number of packets have been received from the network.

10. The method of claim 1 wherein an instance of said HAL interface comprises caching packets in a cache at said node until some specified number of packets from a message being sent have been accumulated by said instance to said communications device, and thereafter injecting packets from said cache with a function call in said HAL interface.

11. The method of claim 1 wherein an instance of said HAL interface comprises peeking at a specified number of specified bytes in a packet associated with one of said ports of said instance, and providing said peeked at bytes to the process associated with said instance.

12. The method of claim 1 further comprising:

creating a second instance of said HAL interface in the node;

additionally obtaining device specific characteristics from a second communications device and a second pointer pointing to access functions in said functions for accessing said second communications device;

opening multiple ports on the second communications device through said functions of said second instance; and sending messages between the node and said second communications device using said access functions pointed to by said second pointer, wherein the messages are optimized with respect to the second communications device as determined by the additionally obtained device specific characteristics.

13. A program product on a computer readable media, said program product including a method for communicating from a node to a communications device in a multinode network, the node having a user space and a Kernel space, and further comprising a communications protocol layer above said communications device, said method comprising:

creating an instance of a hardware abstraction layer (HAL) interface in the node, said HAL interface comprising a communications layer between the communications device and the communications protocol layer and providing for functions that control access to communications devices from said user space in the node;

obtaining device specific characteristics from the communications device and a pointer pointing to access functions in said functions for accessing said communications device;

opening multiple ports on the communications device through the instance of said HAL interface using said functions; and sending messages between the node and the communications device using said access functions pointed to by said pointer, wherein the messages are optimized with respect to the communications device as determined by the obtained device specific characteristics, and said messages are communicated directly to said communications layer below said communications protocol layer thereby bypassing said Kernel space.

14. The product of claim 13 further comprising:

establishing a protocol stack to be used in sending messages between the node and the communications device;

requesting a set of nodes in the network of nodes, said set of nodes to be assigned to said protocol stack;

encapsulating said set of nodes into a partition; and said opening of multiple ports includes opening a port on the communications device and associating that port with said partition through said functions such that a single protocol stack is associated with a single port.

15. The program product of claim 13 wherein said messages are packetized, and further comprising:

sending one packet of a message with a single function call of said instance of said HAL interface.

16. The program product of claim 13 further comprising:

establishing multiple instances of the HAL interface in a single node, each instance having a separate set of ports to said communications device, each instance associated with a separate process on said node.

17. The program product of claim 16 further comprising associating multiple ports with a single process on said node.

18. The program product of claim 16 further comprising associating multiple virtual ports to a separate one of said ports in a single process.

19. The program product of claim 18 further comprising associating a separate protocol stack to each virtual port such that multiple protocol stacks are associated with a single port.

20. The program product of claim 16 further comprising:

sending a notification from an instance of the HAL interface to its associated process for both send and receive events in the communication of messages between said node and said communications device.

21. The program product of claim 20 wherein said messages are sent in multiple packets and said receive notification is delivered after some specified number of packets have been received from the network.

22. The program product of claim 13 wherein an instance of said HAL interface comprises caching packets in a cache at said node until some specified number of packets from a message being sent have been accumulated by said instance to said communications device, and thereafter injecting packets from said cache with a function call in said HAL interface.

23. The program product of claim 13 wherein an instance of said HAL interface comprises peeking at a specified number of specified bytes in a packet associated with one of said ports of said instance, and providing said peeked at bytes to the process associated with said instance.

24. The program product of claim 13 further comprising:

creating a second instance of said HAL interface in the node;

additionally obtaining device specific characteristics from a second communications device and a second pointer pointing to access functions in said functions for accessing said second communications device;

opening multiple ports on the second communications device through said functions of said second instance; and sending messages between the node and said second communications device using said access functions pointed to by said second pointer, wherein the messages are optimized with respect to the second communications device as determined by the additionally obtained device specific characteristics.

25. An apparatus comprising:

a multinode network, one node in said multinode network having a user space and a Kernel space, and further having a communications protocol layer;

a communications device below said communications protocol layer for communicating with said one node in said multinode network;

a hardware abstraction layer (HAL) in said one node between said communications device and said communications protocol layer, said HAL creating an instance of an interface in said node, said interface comprising a communications layer and providing for functions that control access to said communications device from said user space in said one node;

an initiation function in said instance of HAL obtaining device specific characteristics from the communications device and a pointer pointing to access functions in said functions for accessing said communications device;

a port opening function in said instance of HAL opening multiple ports on the communications device through the instance of said interface using said functions; and message sending function in said instance of HAL sending messages between said one node and the communications device using said access functions pointed to by said pointer, wherein the messages are optimized with respect to the communications device as determined by the obtained device specific characteristics, and said messages are communicated directly to said communications layer below said communications protocol layer thereby bypassing said Kernel space.

26. The apparatus of claim 25 further comprising:

a protocol stack in said one node to be used in sending messages between said one node and the communications device;

a set of other nodes in the multinode network assigned to said protocol stack;

a partition in said one node encapsulating said set of other nodes; and a port on the communications device associated with said partition through said functions such that a single protocol stack is associated with a single port.

27. The apparatus of claim 25 wherein said messages are packetized, and further comprising:

a send function in said instance of HAL sending one packet of a message with a single function call of said instance of said interface.

28. The apparatus of claim 25 further comprising:

multiple processes on said one node; and multiple instances of the interface established in a single node, each instance having a separate set of ports to said communications device, each instance associated with a separate one of said processes on said one node.

29. The apparatus of claim 28 further comprising multiple ports associated with a single process on said one node.

30. The apparatus of claim 28 further comprising multiple virtual ports associated with a separate one of said ports in a single process.

31. The apparatus of claim 30 further comprising a separate protocol stack associated with each virtual port such that multiple protocol stacks are associated with a single port.

32. The apparatus of claim 28 further comprising:
a function in said instance of HAL sending a notification from an instance of the interface to its associated process for both send and receive events in the communication of messages between said one node and said communications device.

33. The apparatus of claim 32 wherein said instance of HAL has a function sending messages in multiple packets and said receive notification is delivered after some specified number of packets have been received from the network.

34. The apparatus of claim 25 wherein said instance of said interface comprises caching packets in a cache at said one node until some specified number of packets from a message being sent have been accumulated by said instance to said communications device, and said instance of HAL includes a function thereafter injecting packets from said cache into said network from said communications device.

35. The apparatus of claim 25 wherein said instance of said HAL includes a peek function peeking at a specified number of specified bytes in a packet associated with one of said ports, said peek function providing said peeked at bytes to said process associated with said instance.

36. The apparatus of claim 25 further comprising:
a second communications device;
a second instance of said interface created by said HAL in said one node;
an initiation function in said second instance additionally obtaining device specific characteristics from said second communications device and a second pointer pointing to access functions in said functions for accessing said second communications device;
an port opening function in said second instance opening multiple ports on the second communications device; and
a message sending function in said second instance sending messages between said one node and said second communications device using said access functions pointed to by said second pointer, wherein the messages are optimized with respect to said second communications device as determined by the additionally obtained device specific characteristics.

37. The method of claim 1 further comprising:
directly assembling protocol headers in network buffers, thereby avoiding copy operations during sending of messages.

38. The program product of claim 13 further comprising:
directly assembling protocol headers in network buffers, thereby avoiding copy operations during sending of messages.

39. The apparatus of claim 25 further comprising:
network buffers in said one node, and
a function in said instance of HAL directly assembling protocol headers in said network buffers, thereby avoiding copy operations during sending of messages.

40. The method of claim 1 wherein said HAL may further receive messages via said communications device from said multinode network, said method further comprising:
handling network messages received from said communications device in said communications layer without involvement of said communications protocol layer.

41. The program product of claim 13 wherein said HAL may further receive messages via said communications device from said multinode network, said method further comprising:
handling network messages received from said communications device in said communications layer without involvement of said communications protocol layer.

42. The apparatus of claim 25 wherein said HAL may further receive messages via said communications device from said multinode network, said apparatus further comprising:
a function is said instance of HAL handling network messages received from said communications device in said communications layer without involvement of said communications protocol layer.

* * * * *